(12) United States Patent  
Ling et al.

(10) Patent No.: US 8,709,375 B2  
(45) Date of Patent: Apr. 29, 2014

(54) OIL EXTRACTOR AND THE PREPARATION METHOD THEREOF

(71) Applicant: National Tsing Hua University, Hsinchu (TW)

(72) Inventors: Yong-Chien Ling, Hsinchu (TW); Jen-Yu Liu, Taipei (TW)

(73) Assignee: National Tsing Hua University (TW)

( * ) Notice: Subject to any disclaimer, the term of this patent is extended or adjusted under 35 U.S.C. 154(b) by 0 days.

(21) Appl. No.: 13/833,604

(22) Filed: Mar. 15, 2013

(65) Prior Publication Data

US 2013/0243685 A1     Sep. 19, 2013

(30) Foreign Application Priority Data

Mar. 15, 2012   (TW) .............................. 101108954 A

(51) Int. Cl.
```
C01D 5/00      (2006.01)
C01B 17/96     (2006.01)
E02B 15/04     (2006.01)
B01J 20/02     (2006.01)
C09K 3/00      (2006.01)
```
(52) U.S. Cl.
CPC . *C01D 5/00* (2013.01); *C01B 17/96* (2013.01); *E02B 15/04* (2013.01); *B01J 20/02* (2013.01); *C09K 3/00* (2013.01)

USPC ............ 423/518; 423/544; 423/551; 405/60; 210/242.4; 502/400; 588/249; 252/184

(58) Field of Classification Search
CPC .......... C01D 5/00; C01B 17/96; E02B 15/04; B01J 20/02; C09K 3/00
USPC .......... 423/518, 544, 551; 405/60; 210/242.4; 502/400; 588/249; 252/184
See application file for complete search history.

(56) References Cited

U.S. PATENT DOCUMENTS 2,860,951 A  * 11/1958 Cunningham ................. 423/184  
4,829,045 A  *  5/1989 Fransham ..................... 502/401  
8,293,852 B2 * 10/2012 Lu et al. .......................... 526/72

FOREIGN PATENT DOCUMENTS

EP          0 075 384 A1  *  3/1983  ............... C09K 3/32

* cited by examiner

*Primary Examiner* — Timothy Vanoy  
(74) *Attorney, Agent, or Firm* — Volpe and Koenig, P.C.

(57) ABSTRACT

A method for preparing an oil extractor is provided. The method includes dissolving 0.1~30% by weight of a potassium sulfate, 0.1~30% by weight of a potassium persulfate, and 0.1~30% by weight of a manganese sulfate in a solvent to form a solution; heating the solution to synthesize a compound by a microwave; cooling a temperature of the compound to a room temperature; and removing the solvent from the compound. An extractor prepared from the method is also provided.

14 Claims, 2 Drawing Sheets  
(1 of 2 Drawing Sheet(s) Filed in Color)

OIL EXTRACTOR AND THE PREPARATION METHOD THEREOF

CROSS-REFERENCE TO RELATED APPLICATION AND CLAIM OF PRIORITY

The application claims the benefit of Taiwan Patent Application No. 101108954, filed on Mar. 15, 2012, in the Taiwan Intellectual Property Office, the disclosures of which are incorporated herein in their entirety by reference.

FIELD OF THE INVENTION

The present invention relates to an extractor and the preparation method thereof, and more particularly to an oil extractor and the preparation method thereof

BACKGROUND OF THE INVENTION

Petroleum is a non-renewable energy and cannot be recycled. It is a future tendency to replace the limited crude oil with algae having photosynthesis, carbon recycling, and the high efficiency of land use. There are several advantages in producing oil from microalgae, such as high oil-production, environmental benefits, and the eliminated need of occupying arable land. Some microalgae can even be grown in high salinity environments, so the salinization of land can be used as a place for cultivation of the microalgae. Without this process, these regions cannot be utilized to their full potential. Countries in the world such as the United States and China, are putting a lot of funding and research into microalgae oil. The usual method of extraction is to kill the algae and then extract the oil through the addition of chemical substances; the cost of such procedures is high. The direction of innovation currently contains a one hundred nanometer-sized circular silicon ball, as well as the use of genetically engineered algae to secrete oil automatically outside the cell. To this point, the nano circular silicon ball has not shown selective adsorption of oil and water, and secretion oil outside the cell still has not been successfully commercialized.

Nanomaterial is a new material which has drawn most attention in recent years. After the basic dimensions of the constituted material reach the nanometer scale, its performance will be a series of changes, i.e. nanometer effects (such as small size effect, volume effect, surface effect, quantum-size effect and macroscopic quantum tunneling effect etc.). Therefore, nanomaterials exhibit many novel properties different from conventional materials, and have broad application prospects. Scholars have begun to apply nanomaterials in the research of the oil field industry, such as deep profile control, heavy oil viscosity reduction, and low oil penetration. In an aspect of improving the efficiency of stripping oil, oil-displacing agent of nano membrane and oil-displacing agent of nano-emulsion, etc. have also appeared, but the oil displacement effect of the existing nano membrane displacing agent, nano-emulsion displacing agent, etc. is to lock the macroscopic oil system, and the size thereof can not be reduced to be permeable to algae body for extraction of algae oil. Thus, the expected result is not satisfactory. In addition to these directions, it still requires low energy consumption, more simplicity, greener preparation methods to improve the recovery ratio of the algae oil, and to reduce the damage during the extraction process for the algae. With that said, an inexpensive, environmentally friendly, algae oil extractable, good selective oil adsorption ability new nano-extraction agent for algae oil is to be developed.

In the oil extraction, transportation and processing, there may be a pollution problem of spilling oil in the device, organism and environment due to human or non-human factors. Researches have disclosed use of biological fibers and high molecular weight substances to adsorb oil substances, wherein the former contains coir, cotton fibers, pulp fibers, peat fibers, straw fibers, etc., and the latter contains PP, PS, PU. However, the high molecular weight substances are poor in the dissolution resistance for oil, and the follow-up burned processing will produce toxic gas molecules due to the pyrolysis and oxidation. The biological fibers have the disadvantages of poor oil/water extraction ratio and weak oil-absorbing ability due to high water adsorption rate. Therefore, when removing the oil pollution, the biological fibers often adsorb water and thus sink into the water, which are difficult to recycle and cause secondary pollution.

The patent reference [1] has reported using the porous materials to surround and adsorb oil, wherein the porous materials will swell after adsorbing oil. The patent reference [2] takes advantage of the low specific gravity of the oil-absorbing hydrophobic material to adsorb the oil floating on the surface of the (sea) water. In the present invention, the nanowires less than one micron with hydrophobic characteristics are used to achieve the purpose of adsorbing spilling oil. The size range of adsorbing oil molecules in the present invention includes but is not limited to, from the meter grade of a large area above the water to the micron grade of the micron pores.

[1] Japanese patent: JP 9267420A
[2] US patent: U.S. Pat. No. 4,061,567A

In order to overcome the drawbacks in the prior art, an oil extractor and the preparation method thereof are provided. The particular design in the present invention not only solves the problems described above, but is also easily implemented. Thus, the present invention has the utility for industry.

SUMMARY OF THE INVENTION

In accordance with one aspect of the present invention, a method for preparing an oil extractor is provided. The method includes the steps of (a) dissolving 0.1~30% by weight of a potassium sulfate, 0.1~30% by weight of a potassium persulfate and 0.1~30% by weight of a manganese sulfate in a solvent to form a solution; (b) heating the solution to synthesize a compound by a microwave; (c) cooling a temperature of the compound to a room temperature; and (d) removing the solvent from the compound.

In accordance with another aspect of the present invention, a method for preparing an extractor is provided. The method includes the steps of providing a solution having potassium ions, manganese ions, sulfur-containing ions and an oxygen dissolved therein; and heating the solution to obtain the extractor.

In accordance with a further aspect of the present invention, an oil extractor is provided. The oil extractor includes a salt having a potassium, a manganese, a sulfur and an oxygen.

The nano-extractor for algae oil provided by the present invention is inexpensive, safe and environmentally friendly, high selective for absorbing oil. The specific technical scheme is described as follows.

The synthesized extractor is a nanowire, and the material thereof preferably is a complex salt containing potassium, manganese, sulfur and oxygen. The addition of nanowire material can lower interfacial tension between oil and water, and the nanowire material can serve as adsorbent to promote the separation of oil within the solution. Additionally, since the size of nanowire material is small, thus the nanowire material can adsorb algae oil in the algae bodies, and then the algae oil is recovered by utilizing the density difference between oil and water to enhance the efficiency of oil displacement.

The nanowire material's new raw materials are potassium, manganese, sulfur and oxygen, high hydrophobic and lipophilic properties and high selective adsorption of triglyceride compared with water, and therefore, able to reduce the oil-water interfacial tension, so that the algae oil can easily be extracted.

The nanowire material in the higher polar solvent rendered aggregation phenomenon, while in the lower polar solvent, showed a size distribution of less than one micron. The nanowire materials of less than one micron can reduce the oil-water interfacial tension, and thereby, penetrate the cell membrane or cell wall of the algae. By free access of the nanowire materials to the algae, the oil that does not easily flow out is extracted.

The microwave synthesis of the nanowire materials are preferably multiple batches and intermittent, on the one hand, to shorten the time of traditionally synthesizing nanowires, on the other hand, to reduce excessive high temperatures due to the continuous microwave leading to the formation of a block of the nanowires, to thereby synthesize the nanowires having a larger surface area to enhance the oil recovery rate.

Potassium, manganese, sulfur and oxygen in the formulation in accordance with a collocation of reasonable proportions and synthesis conditions synthesize nanowires for the selective adsorption of oil without adsorbing water characteristics. In view of the effect of adsorbing oil, the nanowires can be used in household cleaners, motor oil adsorption treatment, while extended to the range of applications of extracting algae oil, and thus the cost of harvesting algae oil is greatly reduced.

The above objects and advantages of the present invention will become more readily apparent to those ordinarily skilled in the art after reviewing the following detailed descriptions and accompanying drawings, in which:

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Embodiment 1

0.1~30% by weight of potassium ions, 0.1~30% by weight of manganese ions, 0.1~30% by weight of sulfur-containing ions and 0.1~30% by weight of oxygen are dissolved in 100 mL of water, and then heated in batch by microwave for total 10 minutes, wherein the heating power of the microwave is 80% of the maximal power (the maximal power is 1000 W), and finally the nanowire materials are generated.

Embodiment 2

The raw material is equipped in accordance with the following weight percentages of 0.1% to 30% potassium, 0.1% to 30% manganese, 0.1% to 30% sulfur and 0.1% to 30% oxygen to make up precursors, and the precursors are fully mixed and then heated to synthesize the extractor by batch microwave heating. The method of batch heating comprises one of the following: dissolving the precursors in a flask of 100 mL of water and placing the flask in a microwave oven for batch heating in total for 20 minutes, wherein the heating power of the microwave is 60% of the maximal power (the maximal power is 1000 W). The nano materials are produced after heating, followed by cooling to room temperature, and then washed with de-ionized water, followed by low-temperature baking to remove excess moisture of the nano materials, and finally an extractor having an appearance of nanowire is obtained.

Embodiment 3

The raw material is equipped in accordance with the following weight percentages of 0.1% to 30% potassium, 0.1% to 30% manganese, 0.1% to 30% sulfur and 0.1% to 30% oxygen to make up precursors, and the precursors are fully mixed and then heated to synthesize the extractor by batch heating. The method of batch heating comprises one of the following: dissolving the precursors in 100 mL of water for batch heating in a total manner of 30 minutes, wherein the heating power is 400 W. The nano materials are produced after heating, followed by cooling to room temperature and then washed with de-ionized water, followed by low-temperature baking to remove excess moisture of the nano materials, and finally an extractor having an appearance of nanowire is obtained.

Embodiment 4

Figure 1:
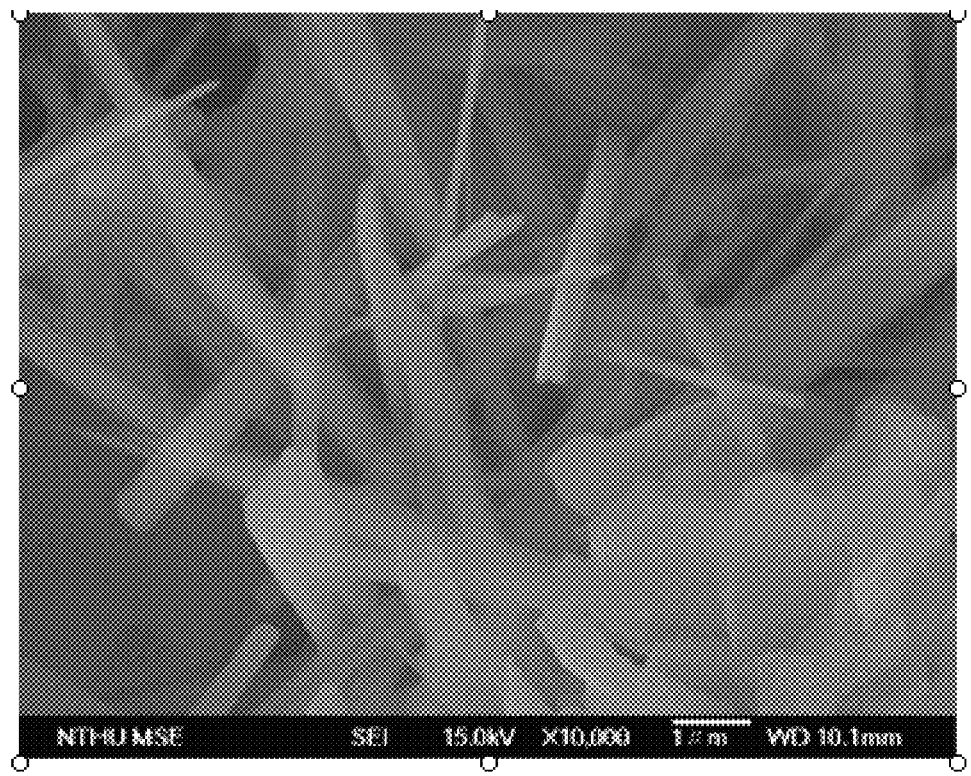
FIG. 1 shows a synthetic anhydrous potassium and manganese alum complex salt observed under the scanning electron microscope, and it's shape is a nanowire according to a preferred embodiment of the present invention.

0.1% to 30% of potassium sulfate, 0.1% to 30% of potassium persulfate and 0.1% to 30% of manganese sulfate are mixed and dissolved in a flask of 100 mL of water, and heated by microwave for 30 seconds and then taken out for stirring, and the heating is repeated for a total of 10 minutes, wherein the heating power of the microwave is 80% of the maximal power (the maximal power is 1000 W). The nano materials are produced after heating, followed by cooling to room temperature and then washed with de-ionized water, followed by low-temperature baking to remove excess moisture of the nano materials, and finally an anhydrous potassium and manganese alum complex salt ($K_2Mn_2(SO_4)_3$) is obtained, as the nanowires shown in FIG. 1.

Embodiment 5

The Recovery Efficiency of the Extractor

First 10 mL of water and 3 mL of oil are mixed, and then 0.066 g of the nano material obtained from the preceding experiments is added in, and the solution is shaken up and down. Next, the nano material is taken from the solution, and the solution is stood to make oil and water stratified for discrimination of the amount of selective adsorption. After 2 minutes, it is found that water is not adsorbed, but oil is adsorbed for 1 mL Embodiment 6

Figure 2:
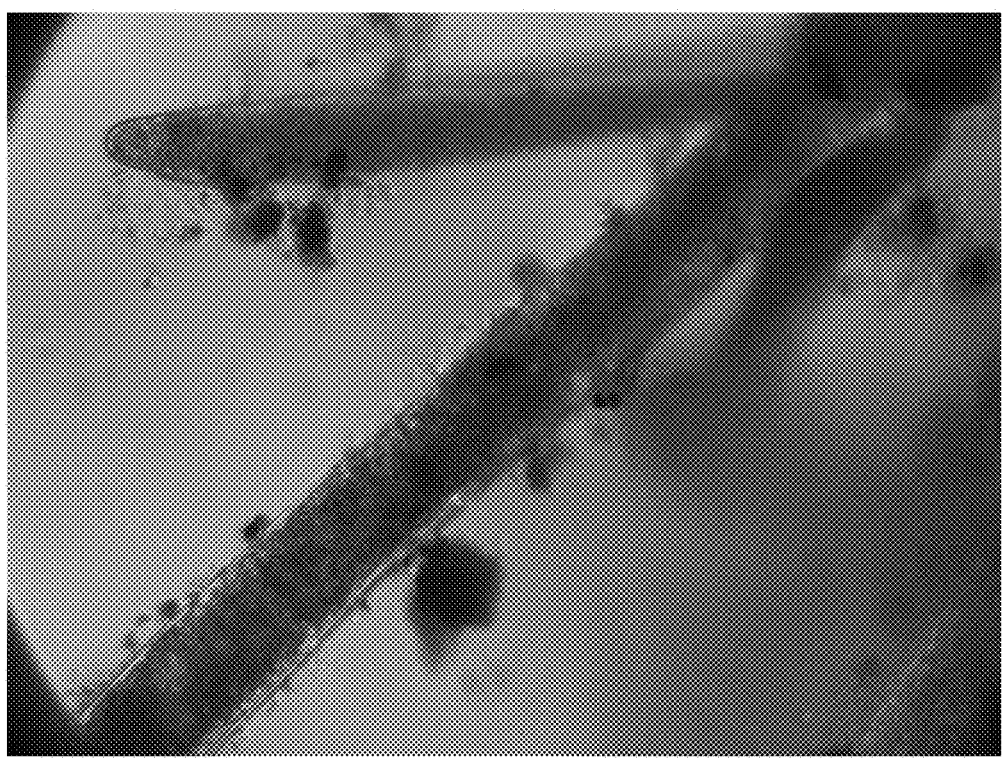
FIG. 2 shows the nanowires getting in and out of the algae cell wall observed under the microscope according to a preferred embodiment of the present invention.

The Nanowires Getting in and out of the Algae Cell Wall 0.001 g of the nanowires is added in 10 mL of water where Chlorella is. After about 1 day, the algae is taken out and observed under a microscope. It is found that the black nanowires appear inside the cell wall of Chlorella, as shown in FIG. 2. The algae oil accumulated in the algae body whose size will be greater than one-micron channels penetrating the cell wall, therefore is confined in the algae body. Generally, extracting algae oil is required the use of a hydrophobic solvent or a gas (supercritical fluid) to break the algae or penetrate the algae to obtain the algae oil. The nanowires less than one micron are employed in the present invention to enter algae body for adsorption of the algae oil. Due to the small size of the nanowires, the algae oil can be carried out from the algae body, and floats on water by the difference of densities between oil and water.

EMBODIMENTS

1. A method for preparing an oil extractor includes the steps of dissolving 0.1~30% by weight of a potassium sulfate, 0.1~30% by weight of a potassium persulfate and 0.1~30% by weight of a manganese sulfate in a solvent to form a solution; heating the solution to synthesize a compound by a microwave; cooling a temperature of the compound to room temperature; and removing the solvent from the compound.

2. In the method of Embodiment 1, the solvent is water.

3. In the method of Embodiments 1-2, the oil extractor has an appearance of nanowire.

4. In the method of Embodiments 1-3, the microwave has a power ranged between 400 W and 800 W.

5. In the method of Embodiments 1-4, the solution is heated for a duration of time ranging between 20 minutes and 40 minutes.

6. In the method of Embodiments 1-5, removing the solvent is performed by baking.

7. A method for preparing an extractor includes the steps of providing a solution and heating the solution to obtain the extractor. The solution has potassium ions, manganese ions, sulfur-containing ions and an oxygen dissolved therein.

8. In the method of Embodiment 7, each of the potassium ions, the manganese ions, the sulfur-containing ions and the oxygen has a weight percentage of 0.1~30, and a sum of the respective weight percentages of the potassium ions, the manganese ions, the sulfur-containing ions and the oxygen is not more than 100.

9. In the method of Embodiments 7-8, the step of heating is performed by a microwave oven.

10. In the method of Embodiments 7-9, the microwave oven is operated in a power ranged between 400 W and 800 W.

11. In the method of Embodiments 7-10, the extractor is an oil extractor.

12. In the method of Embodiments 7-11, the step of heating is performed by batch.

13. In the method of Embodiments 7-12, the method is applied to an algae oil extraction.

14. In the method of Embodiments 7-13, the method is applied to a hydrocarbon extraction extracting a hydrocarbon from waste water produced from an oil-refining or a chemical engineering processes.

15. An oil extractor includes a salt having potassium, manganese, sulfur and oxygen.

16. In the oil extractor of Embodiment 15, the salt is a complex salt of $K_2Mn_2(SO_4)_3$.

17. In the oil extractor of Embodiments 15-16, the salt is anhydrous.

18. In the oil extractor of Embodiments 15-17, each of potassium, manganese, sulfur and oxygen has a weight percentage of 0.1~30, and a sum of the respective weight percentages of the potassium ions, the manganese ions, the sulfur-containing ions and the oxygen is not more than 100.

19. In the oil extractor of Embodiments 15-18, the oil extractor is lipophilic.

20. In the oil extractor of Embodiments 15-19, the oil extractor is hydrophobic.

Based on the above, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included, within the spirit and scope of the appended claims, which are to be accorded with the broadest interpretation so as to encompass all such modifications and similar structures.

What is claimed is:

1. A method for preparing an oil extractor, comprising the steps of:
(a) dissolving 0.1~30% by weight of a potassium sulfate, 0.1~30% by weight of a potassium persulfate and 0.1~30% by weight of a manganese sulfate in a solvent to form a solution;
(b) heating the solution to synthesize a compound by microwave;
(c) cooling a temperature of the compound to room temperature; and
(d) removing the solvent from the compound.

2. A method of claim 1, wherein the solvent is water.

3. A method of claim 1, wherein the oil extractor has an appearance of nanowire.

4. A method of claim 1, wherein the microwave has a power ranged between 400 W and 800 W.

5. A method of claim 1, wherein the solution in the step (b) is heated for duration of time ranging between 20 minutes and 40 minutes.

6. A method of claim 1, wherein the step (d) is performed by baking.

7. A method for preparing an extractor, comprising the steps of:
providing a solution having potassium ions, manganese ions, sulfur-containing ions and an oxygen dissolved therein; and
heating the solution to obtain the extractor.

8. A method of claim 7, wherein each of the potassium ions, the manganese ions, the sulfur-containing ions and the oxygen has a weight percentage of 0.1~30, and a sum of the respective weight percentages of the potassium ions, the manganese ions, the sulfur-containing ions and the oxygen is not more than 100.

9. A method of claim 7, wherein the step of heating is performed by a microwave oven.

10. A method of claim 8, wherein the microwave oven is operated in a power ranged between 400 W and 800 W.

11. A method of claim 7, wherein the extractor is an oil extractor.

12. A method of claim 7, wherein the step of heating is performed by batch.

13. A method of claim 7, wherein the method is applied to an algae oil extraction.

14. A method of claim 7, wherein the method is applied to a hydrocarbon extraction extracting a hydrocarbon from waste water produced from one of an oil-refining and a chemical engineering processes.

* * * * *